March 24, 1959 C. H. EDWARDS ET AL 2,878,511
CARBON BLACK PELLET MILL RECYCLE HOSE IMPROVEMENT
Filed Dec. 31, 1956
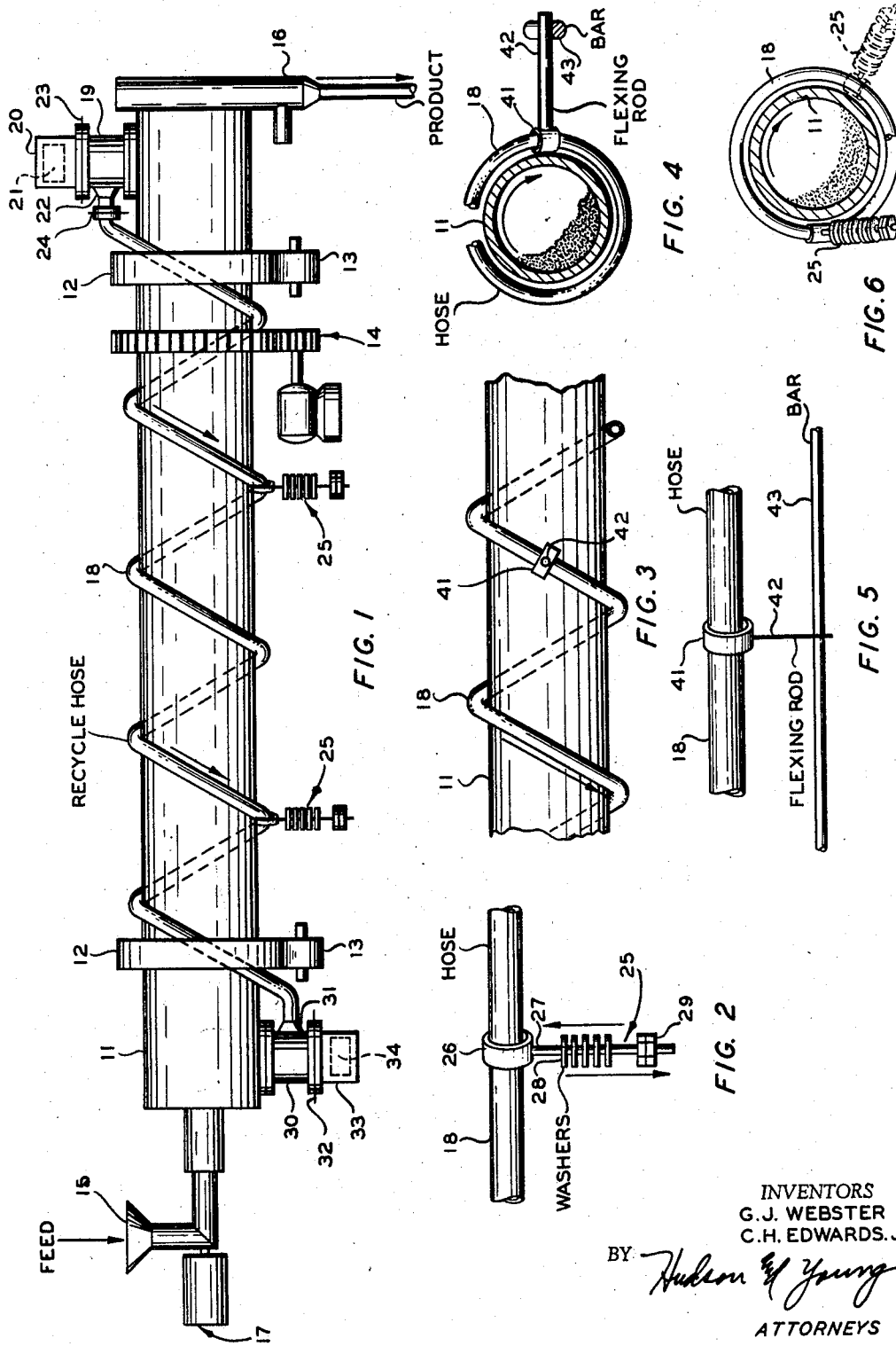
INVENTORS
G.J. WEBSTER
C.H. EDWARDS. JR
BY
ATTORNEYS

United States Patent Office 2,878,511
Patented Mar. 24, 1959

2,878,511

CARBON BLACK PELLET MILL RECYCLE HOSE IMPROVEMENT

Clyde H. Edwards, Borger, Tex., and George J. Webster, Bartlesville, Okla., assignors to Phillips Petroleum Company, a corporation of Delaware Application December 31, 1956, Serial No. 631,548

11 Claims. (Cl. 18—1)

This invention relates to carbon black pelleting. In one aspect it relates to an improvement in the recycling of carbon black pellets during carbon black pelleting operation. In another aspect it relates to a method and apparatus for improved recycling of carbon black pellets.

An object of this invention is to provide a method and apparatus for pelleting flocculent carbon black.

Another object of this invention is to provide a method and apparatus for recycling of carbon black pellets in carbon black pelleting operations.

Yet another object of this invention is to provide an improved method and apparatus for recycling of carbon black pellets wherein carbon black does not adhere to or plug the recycle apparatus.

Still another object of this invention is to provide a relatively inexpensive and simple means for continuously recycling carbon black pellets during pelleting operation.

Yet another object of this invention is to provide means for regulating the rate of pellet recycle so that the recycle apparatus will not become overloaded, and so that carbon black will not adhere to and plug the recycle apparatus.

Many other objects and advantages will be realized upon reading the following description which, taken with the attached drawing, forms a part of this specification.

In certain carbon black pelleting operations an elongated tubular mill is continuously charged with carbon black to be pelleted and the mill is rotated about its longitudinal axis. The axis of such a mill sometimes slopes somewhat downward from the inlet end toward the outlet end to expedite movement of carbon black undergoing pelleting; yet in many cases the axis of such a mill is horizontal. In such carbon black pelleting operations it has been found advantageous to recycle relatively large amounts of the pellets so that a finally produced pellet will many times consist substantially of a number of concentric layers of carbon black, each layer being the result of a once-through trip in the mill. In such operations belt conveyors and screw conveyors have been used for transferring the recycle black. A later improvement which does away with power requirements for recycling the carbon black involves use of a rubber hose wrapped helically around the outer surface of the mill in such a direction that upon rotation of the mill for pelleting purposes the carbon black pellets in the hose travel from their point of inlet near the pelleted product outlet end of the mill toward the feed end of the mill.

In the use of such a hose for transferring recycle pellets it has been found that the mill must be shut down about once each 24-hour operating day in order to remove carbon black adhering to the inner walls of the tube. As is well known in the carbon black pelleting art, some flocculent carbon blacks are sticky. Such carbon blacks stick easily to many surfaces with which they come into contact, the rubber liner of a rubber tube being no exception. Even though the already formed carbon black pellets which are transferred through the recycling pellet hose are sizable materials and, for the most part, they actually roll, at least in part, in the hose while the pellet mill is rotating, carbon black still sticks to the walls of the hose with the result that ultimately the hose may be entirely plugged. One method of maintaining the recycle hose in an operable, that is, unplugged condition, is for an operator to come along occasionally and strike the hose with an object so as to break loose the adhering carbon black. However, this method of maintaining the hose open to the flow of carbon black involves an operator's time and in case an operator is busy elsewhere in the plant the hose may plug before he has an opportunity to strike each of the hoses on the several pellet mills in case the operation involves more than one pellet mill. One disadvantage in this respect is that after a mill operates for a period of time an appreciable amount of carbon black may have adhered to the inner wall of the tube. A sharp blow, of course, loosens this black thereby adding large pieces of carbon black to a stream of carbon black which is intended to be only pellets.

According to this invention we have devised means, for attaching at one or more locations on a carbon black recycle hose, for jarring or preferably causing the hose to twist and otherwise to flex during rotation of the pellet mill. For example, a long bolt is attached to the hose by a band extending therearound with a mass of heavy washers on the bolt. The bolt and washers hang downward during the half of each revolution when they are below the pellet mill. As the pellet mill rotates while the bolt and washers hang downward, these weights twist and flex the hose thereby tending to prevent adherence of carbon black to the wall of the hose and to break loose any carbon black previously deposited on the hose wall. Also, as the mill continues revolving, the bolt and weights contact the wall of the mill until such time as the bolt and washers move downward and swing free from the mill wall. This swinging also twists the hose, and assists in keeping the hose interior free of deposited black. When the washers and bolt hang downward, they tend to stretch the hose, which action also assists in maintaining the interior of the hose clean of adhering black.

Another embodiment of the invention involves fixing of a bolt or rod to the recycle hose in such a manner that the bolt or rod strikes a horizontally disposed rod supported separately from the mill each time the mill rotates. In this manner the hose is vigorously vibrated, twisted and flexed each time the member attached to the hose strikes the rigidly disposed rod.

Figure 1 illustrates one embodiment of our invention in conjunction with a carbon black pelleting mill.

Figure 2 illustrates, on an enlarged scale, a portion of the apparatus of Figure 1.

Figure 3 illustrates another embodiment of our invention.

Figure 4 is an end view of the apparatus of Figure 3.

Figure 5 is a side view of a portion of the apparatus of Figure 3.

Figure 6 is a view of the apparatus of Figure 1 showing operation of apparatus of the invention.

Our invention specifically involves a carbon black pellet mill assembly comprising, in combination, a rotatable tubular mill having its longitudinal axis at least approximately horizontally disposed, said mill having a feed end and a product outlet end, feeding means for introduction of carbon black to be pelleted into the feed end of said mill, means for discharging product from the product outlet end of said mill, a first enclosure on the exterior of said mill nearer said product outlet end of said mill than the feed end, a second enclosure on the exterior of said mill nearer the feed end than the product outlet end, said first and second enclosures communicating with the interior of said mill, a flexible tube disposed helically around said mill in a direction opposite the direction of rotation of said mill when facing the product outlet end thereof, said tube communicating said first enclosure with said second enclosure, an orifice plate disposed intermediate said first enclosure and said flexible tube for regulating the rate of inlet of carbon black pellets into said tube, and an elongated member attached to said tube, said elongated member being adapted to twist, vibrate and to flex said tube upon rotation of said mill.

Furthermore, our invention involves a method for recycling carbon black pellets in a carbon black pelleting operation wherein said pelleting operation is carried out in a rotating tubular zone the axis of which is at least approximately hrizontal, comprising the steps of removing carbon black pellets from a point nearer the product outlet end than the feed end of said zone by rotating said pelleting zone in a predetermined direction of rotation, introducing removed pellets into one end of a flexible tubular zone exterior of the pelleting zone by further rotating said pelleting zone in said direction, passing the pellets through said flexible tubular zone by still further rotating said pelleting zone in said direction, reintroducing the pellets from the other end of said flexible tubular zone into said pelleting zone at a point nearer the feed end than the product outlet end of said pelleting zone by still further rotating said pelleting zone and maintaining free carbon black flowing conditions in said flexible tubular zone by flexing the latter mentioned zone as said pelleting zone rotates.

Referring now to the drawing and specifically to Figure 1, reference numeral 11 identifies a more or less conventional carbon black pellet mill. The longitudinal axis of the mill is horizontal or at least substantially horizontal. Such a mill is usually supported by steel tires 12 resting upon support wheels 13 in a conventional manner. Reference numeral 14 identifies a drive assembly which includes a large gear wheel disposed around the mill and driven by a small gear wheel on the shaft of an electric motor.

A feed hopper 15 is provided, as illustrated, at the inlet end of the mill for introduction of carbon black to be pelleted. Reference numeral 17 identifies a motor driven feed assembly which, in many cases, is an electric motor disposed to rotate a screw conveyor. Reference numeral 16 identifies a pelleted carbon black product outlet disposed at the product end of the mill.

An adapter box 19 is disposed over an opening in the wall of the mill at a point near the outlet end thereof. This adapter box is preferably bolted to the mill in such a manner that if the occosion arises it can easily be detached therefrom. To this adapter box is attached a knocker housing 20 in which is placed a weighted slide knocker 21. Between knocker housing 20 and adapter box 19 is disposed a nonperforate or blanking plate 23 in such a manner that material from adapter box 19 cannot pass into the knocker housing 20 and, furthermore, so that knocker 21 cannot leave housing 20. To the side of the adapter box 19, as shown, is fixed one end of a feeder or adapter 22, the other end being of such size for attaching to one end of a recycle hose 18. The end of the adapter 22 and the end of the hose 18 are provided with flanges between which is disposed an orifice plate 24 for regulation of the rate of flow of carbon black pellets from the adapter box into the hose for recycling.

If one were facing the product outlet end of the pellet mill, as illustrated herein, the pellet mill is intended to rotate in a clockwise direction and the hose 18 is wound around the mill in the opposite direction, that is anticlockwise. It is necessary to thread the hose through the large gear wheel of the drive assembly and through the steel tires 12, for obvious reasons. The other end of the hose 18 is attached to an adapter 31 for connection to adapter box 30. Adapter box 30 is attached to the mill 18 on one side and to a knocker housing 33 on its other side in the same manner as explained relative to adapter box 19. Knocker housing 33 is provided with a knocker 34. A blanking plate 32 is disposed between adapter box 30 and knocker housing 33 for the same purpose as was blanking plate 23. These knockers 21 and 34 are used for keeping the adapter boxes and adapters free from adhering carbon black during operation of the mill. The knockers fall from one end of their respective housings to the other as the mill rotates.

In Figure 1 a pair of flexers 25 is shown attached to the flexible hose 18. Figure 2 illustrates these flexers on an enlarged scale. In Figure 2 the flexer comprises a band or clamp 26 disposed tightly around hose 18. To clamp 26 is threaded or otherwise attached a rod 27. This rod 27 can, when desired, be an ordinary rod, or a bolt, or a tube or other elongated small diameter member. Disposed on rod 27 is a plurality of weighted elements 28, such as washers or nuts or other elements which are heavy and can easily slide on rod 27. To hold these washers or nuts from sliding off the end of rod 27 are lock nuts 29 or other suitable means. Other suitable means include such an element as a washer or nut welded to rod 27 so that during operation of the pellet mill the members 28 cannot possibly be lost from rod 27. With such a flexing element as that illustrated in Figure 2 disposed on hose 18, upon rotation of the pellet mill the flexing elements twist and flex the rubber hose and because of its mass the rubber hose is vigorously flexed which operation makes certain that carbon black does not adhere to the inner wall of the rubber tube. Since the slidable members 28 ordinarily slide once in each direction per revolution of the mill, this sliding and abrupt stopping of the heavy members 28 assists the twisting action in keeping the hose free of adhering carbon black.

In Figures 3, 4 and 5 is illustrated another embodiment of flexing means for preventing adherence of carbon black or to remove carbon black already adhering to the inner walls of the flexible tube. In these figures the flexing element is merely a rod or tube attached rigidly to a clamp which is tightly clamped around hose 18. Such a rod or tube is identified by reference numeral 42 and is attached to a clamp 41 surrounding hose 18. Figure 4 illustrates the particular positioning of rod 42 with respect to the hose and the pellet mill. Upon rotation of the pellet mill in the direction indicated by the directional arrow in Figure 4, the rod 42 strikes a rigidly disposed bar 43, and as the mill continues to rotate, the tube 18 is twisted thus preventing deposition of carbon black, or removing black already deposited.

It has been found that by using either embodiment of flexing member of our invention it is possible to operate a carbon black pelleting mill provided with a recycle hose 18 continuously without having to close down the mill for cleaning the hose from adhering carbon black. When operating such a mill with such a recycle hose without our flexing elements it was necessary to close down the mill at least once every operating day for cleaning out adhering carbon black. It is obvious that such need for cleaning the hose is a costly operation not only from the point of view of labor involved but also from the point of view of the down time of the pelleting equipment.

The following is illustrative of a carbon black pelleting operation using flexing members of our invention. A carbon black pelleting mill 6 feet in diameter by 48 feet long pellets from 12,000 to 15,000 pounds of carbon black per day at about 15 to 24 r.p.m. Such a pelleting operation requires recycling of about double the amount of product produced, that is, about 30,000 pounds per day. Such pellets as are produced in such a mill are about the size of a 30 mesh screen opening with less than 1 percent smaller in size than a 100 mesh screen opening. Almost none of the black was larger than 10 mesh. This mill and recycle assembly was so constructed that the recycle pellets were removed from the mill about one foot from the product end of the mill and these were passed through a 2-inch I.D. rubber hose of such length as to be wrapped around the mill about 4½ times with the discharge end of the rubber hose discharging the recycle pellets into the mill about one foot from the feed end. On this mill with its 4½ turns of recycle hose there were placed two flexing elements similar to those illustrated in Figures 1 and 2. These flexing elements were about 15 inches in length and the washers placed thereon weighed about 3 pounds. From this weight of washers it is realized that the jarring, twisting or flexing effect of these weighted washers was substantial. These two flexing members were positioned about 10 feet from the ends of the mill.

In order to regulate the flow of pellets into the recycle hose each time the adapter box 19 was on the bottom side of the mill, the above-mentioned orifice plate 24 was provided. If an orifice plate was not used for regulating the entrance of pellets into the hose, the amount of pellets entering the hose is surprisingly large and so many pellets can, in some cases, enter the hose as to plug or choke the hose and prevent free flow of pellets. Thus, by providing the orifice plate with an opening of diameter of about 1½ inches for a 2-inch I.D. hose, 30,000 pounds of pellets per operating day are recycled at 15 to 24 r.p.m. If the recycle ratio is to be decreased, an orifice plate with a smaller opening is provided.

However, if a greater recycle ratio is desired, a pair of adapter boxes 29 are provided and each box being provided with an adapter 22. These adapters discharge carbon black pellets into a single hose. The adapters can discharge pellets flowing therethrough through a single orifice plate member or through separate orifice plate members into a single hose. Or, if desired, a pair of hoses similar to hose 18 are attached separately to separate adapters and adapter boxes. In this case double the amount of recycle pellets can be transferred.

If two hoses are used, they discharge their load of pellets through a single adapter similar to adapter 31 into a single adapter box for addition to the mill or they can be arranged to discharge their pellets through separate adapters and adapter boxes.

In addition to the vibration caused by movement of washers 28 on rod 27, there is a twisting action since on the half of a revolution of the pellet mill during which the flexer 25 hangs downward the flexer assembly twists the rubber hose through half a turn; during the other half of a mill revolution the flexers 25 fall in the direction opposite to the aforesaid direction of said twisting. These twisting movements in addition to the sliding of the weights (washer 28), very efficiently prevent deposition of carbon black on the inner walls of tube 18. The same general effect of twisting also occurs when the flexing rod 42 of Figures 3, 4 and 5 is used. This twisting effect of this latter embodiment of my invention is not as great, however, as that caused by flexing member 25.

While certain embodiments of the invention have been described for illustrative purposes, the invention obviously is not limited thereto.

We claim:

1. A carbon black pellet mill assembly comprising, in combination, a rotatable tubular mill having its longitudinal axis at least approximately horizontally disposed, said mill having a feed end and a product outlet end, feeding means for introduction of carbon black to be pelleted into the feed end of said mill, means for discharging product from the product outlet end of said mill, a first enclosure on the exterior of said mill nearer said product outlet end of said mill than the feed end, a second enclosure on the exterior of said mill nearer the feed end than the product outlet end, said first and second enclosures communicating with the interior of said mill, a flexible tube disposed helically around said mill in a direction opposite the direction of rotation of said mill when facing the product outlet end thereof, said tube communicating said first enclosure with said second enclosure, an orifice plate disposed intermediate said first enclosure and said flexible tube for regulating the rate of inlet of carbon black pellets into said tube, and an elongated member attached to said tube, said elongated member being adapted to vibrate and to flex said tube upon rotation of said mill.

2. The assembly of claim 1 wherein said elongated member is an elongated weighted member attached at one end to said flexible tube in such a manner that the axis of said elongated weighted member is disposed radially with respect to said flexible tube.

3. The assembly of claim 1 wherein said elongated member comprises an elongated member attached at one end to said flexible tube in such a manner that the axis of said elongated member is disposed radially with respect to said flexible tube, a weighted slide member disposed to slide from one end to the other end of said elongated member, and means at said other end of said elongated member to hold said slide member in slidable relation with said elongated member.

4. The assembly of claim 3 wherein said weighted slide member is a weighted washer.

5. The assembly of claim 1 wherein said elongated member comprises an elongated member attached at one end to said flexible tube in such a manner that the axis of said elongated member is disposed radially with respect to said flexible tube, a rigidly disposed member supported separately from said mill, said rigidly disposed member being so positioned that said elongated member abruptly contacts same each revolution of said mill in such a manner as to cause the vibration of said flexible tube.

6. An apparatus for recycling carbon black pellets from the carbon black pellet outlet end portion of a rotatable tubular carbon black pellet mill to a point nearer the feed end of said mill than the point for withdrawal of said pellets comprising, in combination, a horizontally disposed rotatable tubular carbon black pellet mill having an outlet end and an inlet end as regards direction of flow of carbon black therein, a flexible tube wrapped helically around said mill in a direction opposite to the direction of rotation of said mill when facing the product outlet end thereof, an orifice plate fixed to the end of said flexible tube near the outlet end of said mill for regulation of the inlet of pellets into said tube, and an elongated member attached to said flexible tube and extending radially therefrom, said elongated member being adapted to vibrate said tube upon rotation of said mill.

7. The assembly of claim 6 wherein said elongated member is an elongated weighted member attached at one end to said flexible tube in such a manner that the axis of said elongated weighted member is disposed radially with respect to said flexible tube.

8. The assembly of claim 6 wherein said elongated member comprises an elongated member attached at one end to said flexible tube in such a manner that the axis of said elongated member is disposed radially with respect to said flexible tube, a weighted slide member disposed to slide from one end to the other end of said elongated member, and means at said other end of said elongated member to hold said slide member in slidable relation with said elongated member.

9. The assembly of claim 8 wherein said weighted slide member is a weighted washer.

10. The assembly of claim 6 wherein said elongated member comprises an elongated member attached at one end to said flexible tube in such a manner that the axis of said elongated member is disposed radially with respect to said flexible tube, a rigidly disposed member supported separately from said mill, said rigidly disposed member being so positioned that said elongated member abruptly contacts same each revolution of said mill in such a manner as to cause vibration of said flexible tube.

11. An apparatus for recycling carbon black pellets from the carbon black pellet outlet end portion of a rotatable tubular carbon black pellet mill to a point nearer the feed end of said mill than the point for withdrawal of said pellets comprising, in combination, a rotatable tubular carbon black pellet mill having an outlet end and an inlet end as regards direction of flow of carbon black therein, a flexible tube wrapped helically around said mill in a direction opposite to the direction of rotation of said mill when facing the product outlet end thereof, an orifice plate fixed to the end of said flexible tube nearer the outlet end of said mill for regulation of the inlet of pellets into said tube, and an elongated member attached to said flexible tube and extending radially therefrom, said elongated member being adapted to vibrate said tube upon rotation of said mill.

References Cited in the file of this patent

UNITED STATES PATENTS

| | | |
|---|---|---|
| 2,187,601 | Glaxner | Jan. 16, 1940 |
| 2,263,118 | Carney | Nov. 18, 1941 |
| 2,503,361 | Studebaker | Apr. 11, 1950 |
| 2,603,832 | Clark et al. | July 22, 1952 |
| 2,638,625 | Studebaker et al. | May 19, 1953 |